US008923693B2

(12) United States Patent
Yeates

(10) Patent No.: US 8,923,693 B2
(45) Date of Patent: Dec. 30, 2014

(54) ELECTRONIC DEVICE HAVING SELECTIVELY STRENGTHENED COVER GLASS

(75) Inventor: Kyle H. Yeates, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/847,926

(22) Filed: Jul. 30, 2010

(65) Prior Publication Data
US 2012/0027399 A1 Feb. 2, 2012

(51) Int. Cl.
| G03B 17/02 | (2006.01) |
| C03C 21/00 | (2006.01) |
| G02B 27/00 | (2006.01) |
| G06F 1/16 | (2006.01) |
| G02F 1/1333 | (2006.01) |

(52) U.S. Cl.
CPC .......... *C03C 21/002* (2013.01); *G02B 27/0018* (2013.01); *G06F 1/1626* (2013.01); *G02F 2001/133331* (2013.01)
USPC ........................................................ 396/535

(58) Field of Classification Search
USPC ...................... 396/535; 65/30.1, 30.13, 30.14; 428/410
See application file for complete search history.

(56) References Cited

U.S. PATENT DOCUMENTS

| 3,558,415 A | 1/1971 | Rieser et al. |
| 3,607,172 A | 9/1971 | Poole et al. |
| 3,753,840 A | 8/1973 | Plumat |
| 3,798,013 A | 3/1974 | Hasegawa et al. |
| 3,843,472 A | 10/1974 | Toussaint et al. |
| 4,015,045 A | 3/1977 | Rinehart |
| 4,119,760 A | 10/1978 | Rinehart |
| 4,165,228 A | 8/1979 | Ebata et al. |
| 4,178,082 A | 12/1979 | Gänswein et al. |
| 4,346,601 A | 8/1982 | France |
| 4,353,649 A | 10/1982 | Kishii |
| 4,425,810 A | 1/1984 | Simon et al. |
| 4,646,722 A | 3/1987 | Silverstein et al. |
| 4,849,002 A | 7/1989 | Rapp |
| 4,872,896 A | 10/1989 | LaCourse et al. |
| 4,957,364 A | 9/1990 | Chesler |
| 4,959,548 A | 9/1990 | Kupperman et al. |
| 4,986,130 A | 1/1991 | Engelhaupt et al. |

(Continued)

FOREIGN PATENT DOCUMENTS

| AT | 283 630 B | 10/1970 |
| DE | 17 71 268 A1 | 12/1971 |

(Continued)

OTHER PUBLICATIONS

Karlsson, Stefan and Bo Jonson, The technology of chemical glass strengthening—a review, Apr. 2010, Glass Technology, European Journal of Glass Science and Techology A, vol. 51, No. 2, pp. 41-54.*

(Continued)

*Primary Examiner* — Clayton E Laballe
*Assistant Examiner* — Linda B Smith

(57) ABSTRACT

Embodiments disclosed therein generally pertain to selectively strengthening glass. More particularly, techniques are described for selectively strengthening cover glass, which tends to be thin, for electronic devices, namely, portable electronic devices. In certain embodiments, selectively strengthening glass, such as cover glass, can be used to provide optical barriers (or channels) internal to the glass. The electronic devices can also provide for camera integration behind the cover glass.

32 Claims, 5 Drawing Sheets

(56) References Cited

U.S. PATENT DOCUMENTS

| | | | |
|---|---|---|---|
| 5,254,149 A | 10/1993 | Hashemi et al. | |
| 5,369,267 A * | 11/1994 | Johnson et al. | 250/214 VT |
| 5,437,193 A | 8/1995 | Schleitweiler et al. | |
| 5,445,871 A | 8/1995 | Murase et al. | |
| 5,525,138 A | 6/1996 | Hashemi et al. | |
| 5,625,154 A | 4/1997 | Matsuhiro et al. | |
| 5,733,622 A | 3/1998 | Starcke et al. | |
| 5,780,371 A | 7/1998 | Rifqi et al. | |
| 5,930,047 A | 7/1999 | Gunz et al. | |
| 5,953,094 A | 9/1999 | Matsuoka et al. | |
| 6,429,840 B1 | 8/2002 | Sekiguchi | |
| 6,516,634 B1 | 2/2003 | Green et al. | |
| 6,521,862 B1 | 2/2003 | Brannon | |
| 6,621,542 B1 | 9/2003 | Aruga | |
| 6,810,688 B1 | 11/2004 | Guisit et al. | |
| 6,936,741 B2 | 8/2005 | Munnig et al. | |
| 7,013,709 B2 | 3/2006 | Hajduk et al. | |
| 7,070,837 B2 * | 7/2006 | Ross | 428/1.1 |
| 7,461,564 B2 | 12/2008 | Glaesemann | |
| 7,652,261 B1 * | 1/2010 | Wilson et al. | 250/370.11 |
| 7,810,355 B2 * | 10/2010 | Feinstein et al. | 65/30.1 |
| 8,110,268 B2 * | 2/2012 | Hegemier et al. | 428/40.1 |
| 8,111,248 B2 | 2/2012 | Lee et al. | |
| 2002/0035853 A1 | 3/2002 | Brown et al. | |
| 2002/0157199 A1 | 10/2002 | Piltingsrud | |
| 2004/0163414 A1 | 8/2004 | Eto et al. | |
| 2005/0193772 A1 | 9/2005 | Davidson et al. | |
| 2006/0070694 A1 | 4/2006 | Rehfeld et al. | |
| 2006/0227331 A1 | 10/2006 | Wollmer et al. | |
| 2006/0238695 A1 | 10/2006 | Miyamoto | |
| 2007/0013822 A1 | 1/2007 | Kawata et al. | |
| 2007/0029519 A1 | 2/2007 | Kikuyama et al. | |
| 2007/0030436 A1 | 2/2007 | Sasabayashi | |
| 2007/0236618 A1 | 10/2007 | Magg et al. | |
| 2008/0074028 A1 | 3/2008 | Ozolins et al. | |
| 2008/0202167 A1 | 8/2008 | Cavallaro et al. | |
| 2008/0243321 A1 * | 10/2008 | Walser et al. | 701/21 |
| 2008/0261057 A1 | 10/2008 | Slobodin | |
| 2008/0264176 A1 | 10/2008 | Bertrand et al. | |
| 2008/0286548 A1 | 11/2008 | Ellison et al. | |
| 2009/0046240 A1 | 2/2009 | Bolton | |
| 2009/0067141 A1 * | 3/2009 | Dabov et al. | 361/753 |
| 2009/0096937 A1 * | 4/2009 | Bauer et al. | 348/739 |
| 2009/0153542 A1 | 6/2009 | Arneson et al. | |
| 2009/0153729 A1 * | 6/2009 | Hiltunen et al. | 348/371 |
| 2009/0161215 A1 * | 6/2009 | Chan | 359/511 |
| 2009/0197048 A1 * | 8/2009 | Amin et al. | 428/142 |
| 2009/0202808 A1 | 8/2009 | Glaesemann et al. | |
| 2009/0220761 A1 | 9/2009 | Dejneka et al. | |
| 2009/0257189 A1 * | 10/2009 | Wang et al. | 361/679.56 |
| 2009/0294420 A1 | 12/2009 | Abramov et al. | |
| 2009/0324899 A1 | 12/2009 | Feinstein et al. | |
| 2009/0324939 A1 | 12/2009 | Feinstein et al. | |
| 2010/0009154 A1 | 1/2010 | Allan et al. | |
| 2010/0215862 A1 * | 8/2010 | Gomez et al. | 427/419.4 |
| 2010/0224767 A1 | 9/2010 | Kawano et al. | |
| 2010/0279067 A1 | 11/2010 | Sabia et al. | |
| 2010/0285275 A1 | 11/2010 | Baca et al. | |
| 2010/0296027 A1 * | 11/2010 | Matsuhira et al. | 349/96 |
| 2010/0315570 A1 | 12/2010 | Mathew et al. | |
| 2011/0003619 A1 * | 1/2011 | Fujii | 455/566 |
| 2011/0019123 A1 | 1/2011 | Prest et al. | |
| 2011/0019354 A1 | 1/2011 | Prest et al. | |
| 2011/0056244 A1 * | 3/2011 | Weng et al. | 65/30.14 |
| 2011/0067447 A1 * | 3/2011 | Zadesky et al. | 65/30.14 |
| 2011/0072856 A1 | 3/2011 | Davidson et al. | |
| 2011/0102346 A1 * | 5/2011 | Orsley et al. | 345/173 |
| 2011/0159321 A1 | 6/2011 | Eda et al. | |
| 2011/0164372 A1 | 7/2011 | McClure et al. | |
| 2011/0248152 A1 * | 10/2011 | Svajda et al. | 250/221 |
| 2011/0300908 A1 | 12/2011 | Grespan et al. | |
| 2012/0018323 A1 * | 1/2012 | Johnson et al. | 206/320 |
| 2012/0027399 A1 | 2/2012 | Yeates | |
| 2012/0105400 A1 | 5/2012 | Mathew et al. | |
| 2012/0135195 A1 | 5/2012 | Glaesemann et al. | |
| 2012/0136259 A1 | 5/2012 | Milner et al. | |
| 2012/0151760 A1 | 6/2012 | Steijner | |
| 2012/0236477 A1 | 9/2012 | Weber et al. | |
| 2012/0236526 A1 | 9/2012 | Weber et al. | |
| 2012/0281381 A1 | 11/2012 | Sanford | |

FOREIGN PATENT DOCUMENTS

| | | |
|---|---|---|
| DE | 32 12 612 A1 | 10/1983 |
| DE | 103 22 350 A1 | 12/2004 |
| EP | 2025556 A2 * | 2/2009 |
| EP | 2036867 A1 | 3/2009 |
| EP | 2075237 | 7/2009 |
| GB | 1 346 747 | 2/1974 |
| JP | 55031944 | 3/1980 |
| JP | 55-95645 | 7/1980 |
| JP | 55 144450 | 11/1980 |
| JP | 59037451 | 2/1984 |
| JP | 6066696 | 10/1986 |
| JP | 63 060129 | 3/1988 |
| JP | 63222234 | 9/1988 |
| JP | 6242260 A | 9/1994 |
| JP | A 2008-216938 | 9/2008 |
| JP | A 2008-306149 | 12/2008 |
| JP | 2010 064943 | 3/2010 |
| JP | 2010/195600 | 9/2010 |
| WO | WO 00/47529 A | 8/2000 |
| WO | WO 02/42838 A1 | 5/2002 |
| WO | WO 2004/106253 A | 12/2004 |
| WO | WO 2008/044694 A | 4/2008 |
| WO | WO 2008/143999 A1 | 11/2008 |
| WO | WO 2010/005578 | 1/2010 |
| WO | WO 2010/014163 | 2/2010 |
| WO | WO 2010/019829 A1 | 2/2010 |
| WO | WO 2012/015960 | 2/2012 |
| WO | WO 2012/106280 | 8/2012 |

OTHER PUBLICATIONS

First Examiner's Report for Australian Patent Application No. 2011282730, mailed May 17, 2013.
Aben "Laboratory of Photoelasticity", Institute of Cybernetics at TTU, www.ioc.ee/res/photo.html, Oct. 5, 2000.
Forooghian et al., Investigative Ophthalmology & Visual Science; Oct. 2008, vol. 49, No. 10.
Arun K. Varshneya, Chemical Strengthening of Glass: Lessons Learned and Yet to be Learned, International Journal of Applied Glass Science, 2010, 1, 2, pp. 131-142.
Chemically Strengthened Glass, Wikipedia, Apr. 19, 2009, http://en/wikipedia.org/w/index.php?title=Chemically_strengthened_glass&oldid=284794988.
Wikipedia: "Iphone 4", www.wikipedia.org, retrieved Oct. 31, 2011, 15 pgs.
"Toward Making Smart Phone Touch-Screens More Glare and Smudge Resistant", e! Science News, http://eciencenews.com/articles/2009/08/19toward.making.smart.phone.touch.screens.more.glare.and.smudge.resistant, Aug. 19, 2009, 1 pg.
Partial International Search Report for International Patent Application No. PCT/US2001/045592, mailed Dec. 5, 2011.
International Search Report and Written Opinion for International Patent Application No. PCT/US2001/045592, mailed Mar. 6, 2012.
U.S. Appl. No. 13/235,090, entitled "Electronic Device Having Selectively Strengthened Glass", filed Sep. 16, 2011.

* cited by examiner

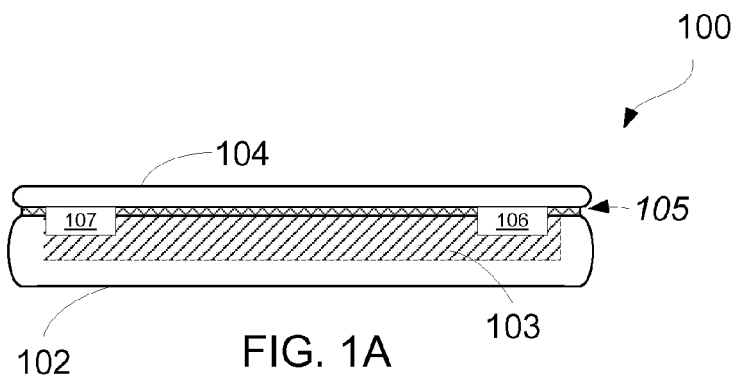
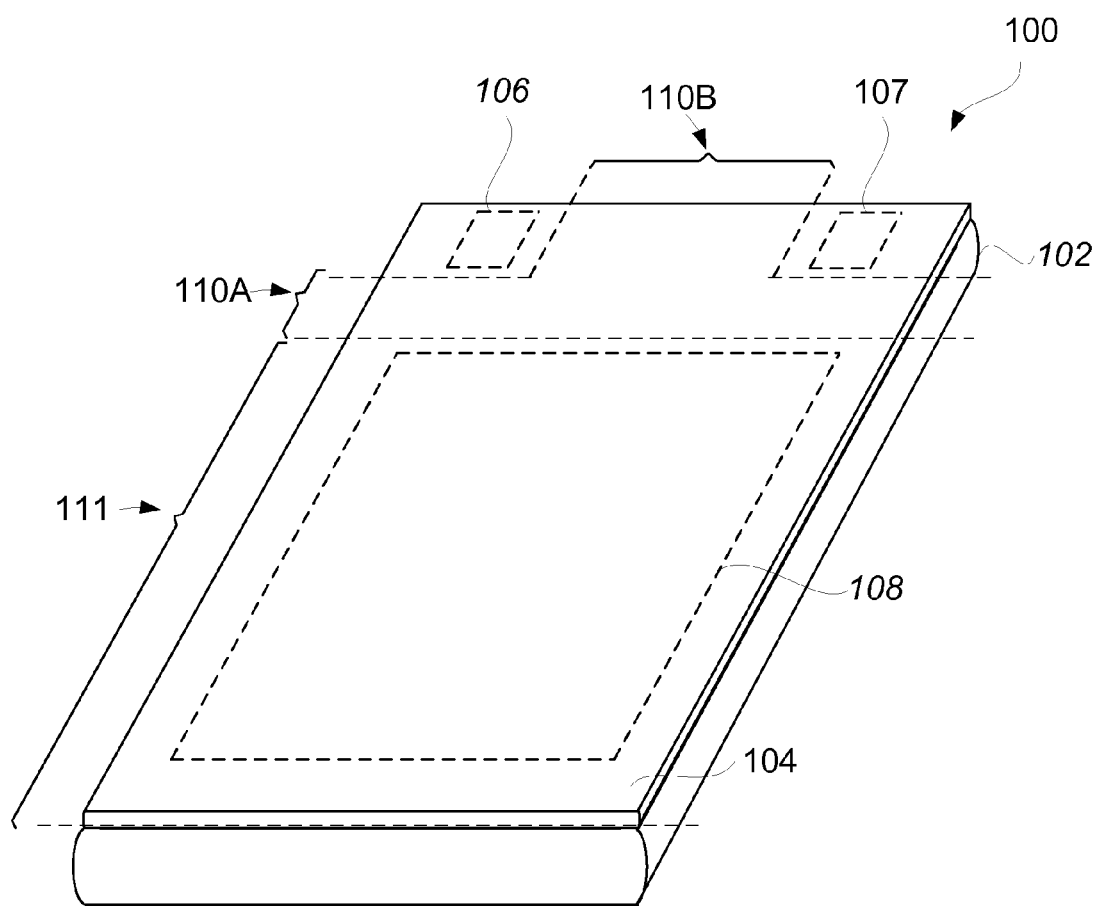
FIG. 1A
FIG. 1B

ELECTRONIC DEVICE HAVING SELECTIVELY STRENGTHENED COVER GLASS

BACKGROUND OF THE INVENTION

Conventionally, small form factor devices, such as handheld electronic devices, have a display arrangement that includes various layers. The various layers include at least a display technology layer. Additionally, a sensing arrangement and/or a cover window may be disposed over the display technology layer. By way of example, the display technology layer may include or pertain to a Liquid Crystal Display (LCD) that includes a Liquid Crystal Module (LCM). The LCM generally includes an upper glass sheet and a lower glass sheet that sandwich a liquid crystal layer therebetween. The sensing arrangement may be a touch sensing arrangement such as those used to create a touch screen. For example, a capacitive sensing touch screen can include substantially transparent sensing points or nodes dispersed about a sheet of glass (or plastic). In addition, the cover window, which is typically designed as the outer protective barrier, may be glass or plastic. However, glass tends to provide a better protective barrier given its strength and scratch resistance.

Further, rapid improvements in size and cost of digital camera technology have lead to integration of one or more digital cameras into various portable electronic devices. While such integration provides convenience in having camera functionality available, often quality of images or video captured by such integrated cameras suffers. Moreover, although images or video of dark scenes could benefit from a flash or other illumination, for various reasons including integration difficulties, flash or other illumination are often omitted from portable electronic devices.

Thus, in electronic devices there is a continuing need for improved approaches for camera integration and for glass cover arrangements.

SUMMARY OF THE INVENTION

Embodiments disclosed therein generally pertain to selectively strengthening glass. More particularly, techniques are described for selectively strengthening cover glass, which tends to be thin, for electronic devices, namely, portable electronic devices. In certain embodiments, selectively strengthening glass, such as cover glass, can be used to provide optical barriers (or channels) internal to the glass. The electronic devices can also provide for camera integration behind the cover glass.

The invention can be implemented in numerous ways, including as a method, system, device or apparatus. Several embodiments of the invention are discussed below.

As a consumer electronic product, one embodiment can, for example, include at least a housing, electrical components disposed at least partially internal to the housing, and a cover glass coupled with the housing. The cover glass includes a selectively chemically strengthened surface region.

As a consumer electronic product, another embodiment can, for example, include at least a housing, electrical components disposed at least partially internal to the housing, and a cover glass coupled to the housing. The electrical components including at least a camera, and the cover glass being substantially transparent to the camera. In addition, the cover glass includes at least one optical barrier interposed within the cover glass between the camera and a remainder of the cover glass for reducing glare at the camera via the cover glass.

As a consumer electronic product, still another embodiment can, for example, include at least a housing, electrical components disposed at least partially internal to the housing, where the electrical components include at least a camera and an illuminator; and a cover glass substantially transparent to the camera and the illuminator. The cover glass including an optical barrier region disposed within the cover glass between the camera and the illuminator.

As a method for assembling an electronic product, one embodiment can, for example, include at least obtaining cover glass and shielding a portion of the cover glass. The shielding provides the cover glass with at least one shielded portion and at least one unshielded portion. The embodiment can also chemically strengthening the at least one unshielded portion of the cover glass. Thereafter, the cover glass can be attached to a housing for the electronic product.

As a method for assembling an electronic product, one embodiment can, for example, include at least disposing electrical components comprising a camera at least partially internal to a housing, and coupling the cover glass to the housing. The cover glass can be adjacently disposed to the camera. The cover glass can be substantially transparent to the camera. The cover glass can also include at least an optical barrier interposed within the cover glass between the camera and a remainder of the cover glass.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIGS. 1A and 1B are various views of an electronic device in accordance with one embodiment.

DETAILED DESCRIPTION OF THE INVENTION

Figure 2:
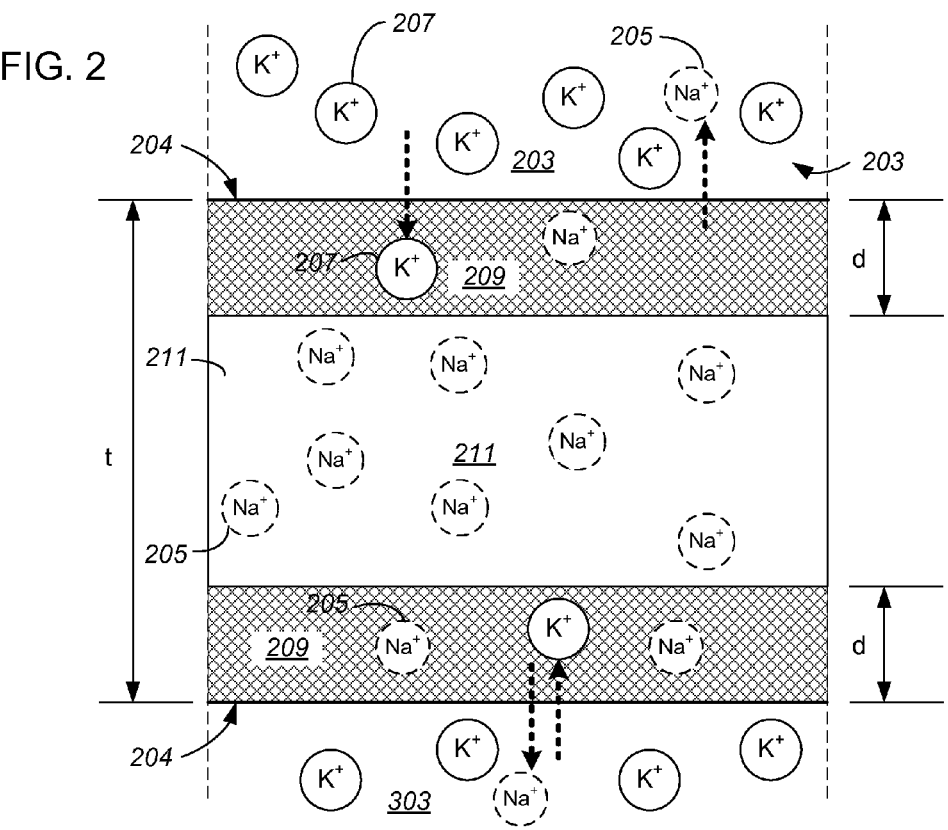
FIG. 2 shows a detailed partial cross sectional view of selective strengthening of exposed surface portions of cover glass.

Embodiments disclosed therein generally pertain to selectively strengthening glass. More particularly, techniques are described for selectively strengthening cover glass, which tends to be thin, for electronic devices, namely, portable electronic devices. In certain embodiments, selectively strengthening glass, such as cover glass, can be used to provide optical barriers (or channels) internal to the glass. The electronic devices can also provide for camera integration behind the cover glass.

Embodiments of the invention are discussed below with reference to FIGS. 1A-5. However, those skilled in the art will readily appreciate that the detailed description given herein with respect to these figures is for explanatory purposes as the invention extends beyond these limited embodiments.

FIGS. 1A and 1B are various views of an electronic device 100 in accordance with one embodiment. The electronic device 100 may, for example, be embodied as portable or handheld electronic device having a thin form factor (or low profile). The electronic device 100 can, for example, correspond to a media player, a media storage device, a Portable Digital Assistant (PDA), a tablet PCs, a computer, a cellular phone, a smart phone, a GPS unit, a remote control, and the like.

As shown in cross sectional view in FIG. 1A, the electronic device 100 may include a housing 102 that serves as the outer surface for the electronic device 100. Electrical components 103 may be disposed within the housing 102. The electrical components may include, but are not limited to, a controller (or processor), memory, battery, display, camera, and illuminator such as a flash.

Additionally, the electronic device 100 may have a cover glass 104. The cover glass 104 may serve as an external surface, i.e., top surface, for the electronic device 100. The cover glass 104 may also resist scratching and therefore may provide a substantially scratch-resistance surface for the top surface of the housing 102 for the electronic device 100. The cover glass 104 may be coupled to the housing 102, for example, using an adhesive 105.

The electronic device 100 is shown in perspective view in FIG. 1B. The cover glass 104 may be provided over a camera area 106. In one example, the camera area 106 may comprise at least a camera such as a digital camera for capturing images or video. At the camera area 106, the cover glass 104 may be substantially transparent to the camera, for capturing images or video through the cover glass 104. The camera area 106 may be disposed within the housing 102 of the electronic device 100. A minority region of cover glass 104 adjacent to the camera may extend over the camera area 106. As shown in FIG. 1B, the cover glass 104 can substantially overlap the camera, and a peripheral region of the cover glass 104 adjacent to the camera may extend over the camera area 106.

Similarly, the cover glass may be provided over an illuminator area 107. In one example, the illuminator area 107 may comprise at least an illuminator such as a light emitting diode (LED) or electronic flash tube for illuminating dark scenes. At the illuminator area 107, the cover glass 104 may be substantially transparent to the illuminator and arranged so that illumination may project outwardly from the cover glass 104. The illuminator area 107 may be disposed within the housing 102 of the electronic device 100.

Additionally, the cover glass 104 may be provided over a display area 108. The cover glass 104 may be substantially transparent so that the display area 108 can be viewed through the cover glass 104. The display area 108 may be disposed within the housing 102 of the electronic device 100. The electronic device 100 may include a full view or substantially full view display area 108 that consumes a majority of the front surface of the electronic device 100. The display area 108 may be embodied in a variety of ways. In one example, the display area 108 may comprise at least a display such as a flat panel display and more particularly an LCD display.

The display area 108 may alternatively or additionally include a touch sensing device positioned over a display screen. For example, the display area 108 may include one or more glass layers having capacitive sensing points distributed thereon. Each of these components may be separate layers or they may be integrated into one or more stacks. In one embodiment, the cover glass 104 may act as the outer most layer of the display area 108. The adhesive 105 can be translucent and extend around the periphery so as to not optically interfere with the display area 108, the camera area 106 or the illuminator area 107.

The electronic device 100 may include a display region (e.g., the display area 108) that includes various layers. The various layers may include at least a display, and may additionally include a sensing arrangement disposed over the display. In some cases, the layers may be stacked and adjacent one another, and may even be laminated thereby forming a single unit. In other cases, at least some of the layers are spatially separated and not directly adjacent.

For example, the sensing arrangement may be disposed above the display such that there is a gap therebetween. By way of example, the display may include a Liquid Crystal Display (LCD) that includes a Liquid Crystal Module (LCM). The LCM generally includes at least an upper glass sheet and a lower glass sheet that at least partially sandwich a liquid crystal layer therebetween. The sensing arrangement may be a touch sensing arrangement such as those used to create a touch screen.

For example, a capacitive sensing touch screen may include substantially transparent sensing points or nodes dispersed about cover glass 104. The cover glass 104 may serve as the outer protective barrier for the display region 108. Typically, the cover glass 104 may be adjacent to the display region 108, but may also be integrated with the display region 108, such as another layer (outer protective layer) therefor.

As shown in FIG. 1B, the cover glass 104 may extend across the entire top surface of the housing 102. In such a case, the edges of the cover glass 104 may be aligned, or substantially aligned, with the sides of the housing 102.

Given that the thickness of the cover glass 104 may be rather thin (i.e., less than a few millimeters), the glass material for the cover glass 104 can be selected from available glass that is stronger. For example, alumino silicate glass (e.g., DVTS from Corning) is one suitable choice for the glass material for the cover glass 104. Other examples of glass materials include, but are not limited to including, sodalime, borosilicate, and the like. Additionally, the edges of the cover glass 104 can be configured to correspond to a particular predetermined geometry. By machining the edges of the cover glass 104 to correspond to the particular predetermined geometry, the cover glass pieces can become stronger. For additional information about use of predetermined geometries, see U.S. Provisional Patent Application No. 61/156,803, filed Mar. 2, 2009 and entitled "Techniques for Strengthening Glass Covers for Portable Electronic Devices", which hereby incorporated herein by reference in its entirety.

Moreover, as will be discussed in greater detail subsequently herein, the cover glass 104 can be selectively chemically treated for further strengthening. One suitable chemical treatment is to selectively expose one or more surface portions of the cover glass in a chemical bath containing potassium (e.g., KNO3) for a period of time (e.g., several hours) at an elevated temperature. The selective chemical treatment can desirably result in higher compression stresses at the selectively exposed surface portions of the cover glass pieces. The higher compression stresses may be the result ion exchange wherein K+ ions effectively replacing some Na+ ions at or near the selectively exposed surface portions of the cover glass.

In addition to such selective strengthening, reducing glare (e.g., veiling glare) may improve quality of images or video captured by the camera of camera area 106. Optical features such as an optical barrier region 110 may be disposed in the cover glass 104. The optical barrier region 110 may substantially reduce veiling glare, substantially inhibiting such diffuse stray light from reaching the image plane of the camera. Veiling glare might otherwise reduce contrast and resolution of images or video captured by the camera.

In particular, optical barrier region 110A may be interposed within the cover glass 104 between the camera of the camera area 106 and a remainder 111 of the cover glass 104, for reducing veiling glare at the camera via the cover glass 104. Similarly, optical barrier region 110B may be disposed within the cover glass 104 between the camera of camera area 106 and the illuminator of the illuminator area 107. The optical barrier region 110B may serve to substantially reduce light from the illuminator from coupling into the camera by way of the cover glass 104. More specifically, the optical barrier region 110B may serve to substantially reduce veiling glare from the illuminator from coupling into the camera by way of the cover glass 104.

As shown in FIG. 1B the remainder 111 of the cover glass 104 may comprise a majority region of the cover glass 104. The remainder 111 of the cover glass 104 may comprise a selectively chemically strengthened surface region. In addition to strengthening, the previously discussed ion exchange may increase index of refraction at or near the selectively exposed surface portions of the cover glass 104.

Conversely, ion exchange may be inhibited in masked areas where corresponding surface portions of the cover glass are not exposed to the chemical bath containing potassium (e.g. KNO3.) Since ion exchange may be inhibited, such masked surface portions may retain a lower index of refraction relative to the increased index of refraction of the selectively chemically strengthened surface region.

The optical barrier region 110 may present a substantial change in refractive index disposed within the cover glass 104. More specifically, adjacent changes from increased index of refraction to lower index of refraction and/or changes from lower index of refraction to increased index of refraction may provide a refractive index barrier in the optical barrier region 110 of the cover glass 104. Accordingly, the optical barrier region 110 may be formed at such index transitions by selectively strengthening the cover glass 104.

The apparatus, systems and methods according to embodiments described herein are especially suitable for cover glasses or displays (e.g., LCD displays) assembled in small form factor electronic devices such as handheld electronic devices (e.g., mobile phones, media players, personal digital assistants, remote controls, etc.) The apparatus, systems and methods can also be used for cover glasses or displays for other relatively larger form factor electronic devices (e.g., portable computers, tablet computers, displays, monitors, televisions, etc.).

In one embodiment, the size of a glass cover depends on the size of the associated electronic device. For example, with handheld electronic devices, the glass cover is often not more than five (5) inches diagonal. As another example, for portable electronic devices, such as smaller portable computers or tablet computers, the glass cover is often between four (4) to twelve (12) inches diagonal. As still another example, for portable electronic devices, such as full size portable computers, displays or monitors, the glass cover is often between ten (10) to twenty (20) inches diagonal or even larger. The glass cover is typically rather thin, such as having a thickness less than about 5 mm, or more specifically less than about 3 mm, or more specifically less than about 1 mm.

FIG. 2 shows a detailed partial cross sectional view of selective strengthening of exposed surface portions of cover glass 204. FIG. 2 diagrammatically illustrates a chemical treatment process of submerging the cover glass 204 in a heated potassium bath 203 (for example a molten KNO3 bath), for selective chemically strengthening the cover glass 204. When the cover glass 204 is submerged or soaked in the heated potassium bath 203, diffusion and ion exchange can occur at exposed surface portions of the cover glass 204. Ion exchange may be inhibited in masked areas where corresponding surface portions of the cover glass are not exposed to the chemical bath.

As shown in FIG. 2, $Na^+$ ions 205 which are present in cover glass 204 can diffuse into potassium bath 203, while $K^+$ ions 207 in potassium bath 203 can diffuse into cover glass 204 such that a compressive surface layer 209 can be formed. In other words, $K^+$ ions 207 from potassium bath 203 can be exchanged with $Na^+$ ions 205 to form compressive surface layer 209. The $K^+$ ions 207 can provide a compressive stress surface stress (CS) of the compressive surface layer 209, which chemically strengthens the compressive surface layer 209 of the cover glass 204.

Cover glass 204 is shown in FIG. 2 as having a thickness (t). By controlling chemical treatment parameters such as the length of time of chemical strengthening treatment and/or the concentration of $K^+$ ions 207 in potassium bath 203, a depth (d) of compressive surface layer 209 and compressive stress surface stress (CS) of the compressive surface layer 209 may be substantially controlled. In FIG. 2, the compressive surface layer undergoing ion exchange can have an increased refractive index, and is shown using cross hatching.

In some cases, $K^+$ ions 207 may not diffuse into a center portion 211 of cover glass 204. In FIG. 2 the center portion 211 is shown without cross hatching. The central portion 211 of the cover glass 204 can have a central tension (CT) in response to the compressive stress surface stress (CS) of the compressive surface layer 209.

FIGS. 3A-3D are simplified cross sectional views showing various embodiments of optical barrier regions for substantially reducing transmission of glare (e.g., veiling glare). In FIGS. 3A-3D, portions of a cover glass that do not undergo ion exchange (selective chemical strengthening) have a lower refractive index, and are shown as having no cross hatching. Portions of the cover glass that undergo ion exchange (selective chemical strengthening) have an increased refractive index, and are highlighted with cross hatching.

Figure 3A:
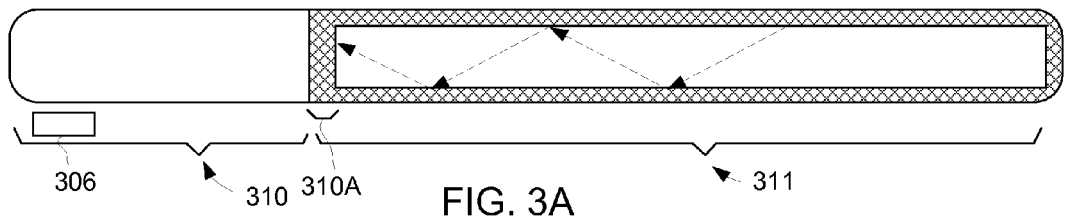
FIGS. 3A-3D are simplified cross sectional views showing various embodiments of optical barrier regions.

In one embodiment shown in longitudinal cross sectional view in FIG. 3A, a peripheral region 310 of the cover glass was masked to inhibit ion exchange. Accordingly, the resulting peripheral region 310A is shown as entirely without cross hatching, corresponding to the lower refractive index. Foil can, for example, be used for masking. Further, photolithographic patterning of ion exchange (selective chemical strengthening) of the cover glass may be done by photolithographically patterning masks thereon. In such case, photosensitive polyimide may be used for masking; or an applied over layer of aluminum (which may be applied by sputtering) may be photolithographically patterned into a patterned mask using photoresist and etching of the aluminum.

As shown in FIG. 3A, adjacent to the peripheral region 310 of the cover glass, the low refractive index of the peripheral region 310 changes to the increased index, corresponding to ion exchange and shown as extending entirely or substantially through thickness of the cover glass (highlighted by cross hatching extending through the thickness of the cover glass). As mentioned previously, adjacent changes from increased index of refraction to lower index of refraction and/or changes from lower index of refraction to increased index of refraction may provide a refractive index barrier at an optical barrier region 310A of the cover glass.

Veiling glare propagating in the cover glass is depicted in FIG. 3A by notional dashed line arrows. The optical barrier region 310A may substantially reduce veiling glare, substantially inhibiting such diffuse stray light from reaching the image plane of camera 306. Accordingly, the optically barrier region 310A is shown in FIG. 3A as blocking the notional dashed line arrows, so as to depict such substantial reduction in veiling glare.

Depth of ion exchange, for example the foregoing deep ion exchange extending entirely or substantially through thickness of the cover glass, may be controlled in various ways for various cover glass thicknesses, for example by using high ion concentrations and/or bath temperatures and/or extended bath soak times, and/or by using applied electric fields to enhance diffusion and/or by using high mobility ions such as silver ions in addition to potassium ions. Silver ions may provide higher polarizability than potassium ions, and may provide a corresponding greater increase in refractive index.

Figure 3B:
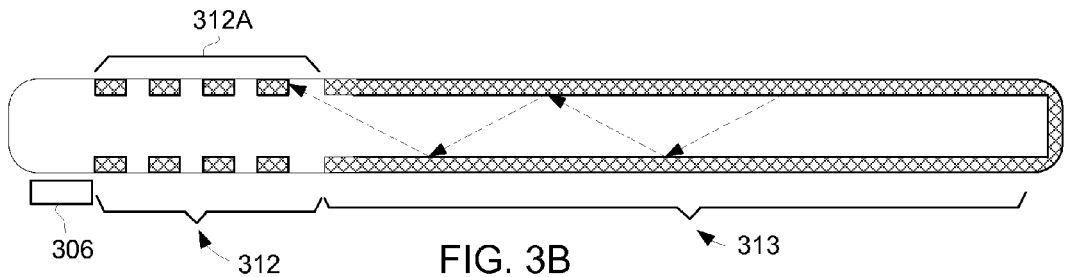

In FIGS. 3A and 3B, the majority remainder 311 of the cover glass may comprise a selectively chemically strengthened surface region. In addition to strengthening, the previously discussed ion exchange may increase index of refraction (highlighted by cross hatching) at or near the selectively exposed surface portions of the cover glass. The center portion of the remainder 311, where ions may not have diffused is shown without cross hatching, corresponding to the lower index of refraction.

In another embodiment shown in longitudinal cross sectional view in FIG. 3B, a photolithographically patterned mask may selectively inhibit and allow ion exchange in an optical barrier region 312A of a peripheral region 312 of the cover glass, as highlighted by alternating cross hatching. Such adjacent changes from increased index of refraction to lower index of refraction and/or changes from lower index of refraction to increased index of refraction may provide a refractive index barrier in the optical barrier region 312A of the cover glass.

A very large number of index changes may be employed (although for the sake of simplicity a modest number or index changes are shown in FIG. 3B). Further, the patterning may be finely spaced and/or may be varied so as to provide an optical grating at various light wavelengths. For the sake of simplicity patterning is coarsely shown in FIG. 3B.

Similar to FIG. 3A, veiling glare propagating in the cover glass is likewise depicted in FIG. 3B by notional dashed line arrows. The optical barrier region 310A may substantially reduce veiling glare, substantially inhibiting such diffuse stray light from reaching the image plane of camera 306. Accordingly, the optically barrier 310A region is shown in FIG. 3B as blocking the notional dashed line arrows, so as to depict such substantial reduction in veiling glare.

As shown in FIGS. 3A-3D, the minority region of cover glass may be adjacent to the camera 306 and may extend over the camera 306. As shown in FIGS. 3A-3D, the cover glass may substantially overlap the camera 306. For example, the peripheral region of the cover glass adjacent to the camera 306 may extend over the camera 306.

Figure 3C:
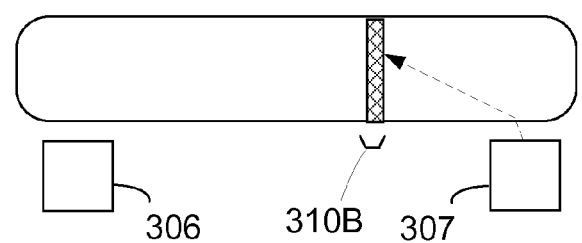
Figure 3D:
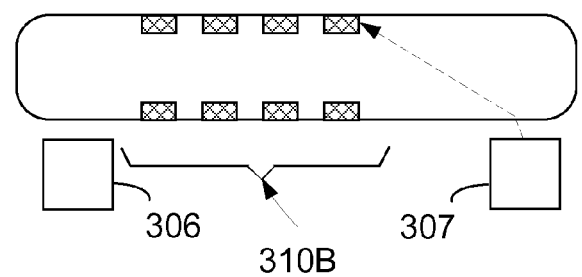

Similarly, the cover glass may be provided over illuminator 307, as shown in lateral cross sectional view in FIGS. 3C and 3D. Optical barrier region 310B may be disposed within the cover glass between the camera 306 and the illuminator 307. The optical barrier region 310B may serve to substantially reduce light from the illuminator 307 from coupling into the camera 306 by way of the cover glass. More specifically, the optical barrier region 310B may serve to substantially reduce veiling glare from the illuminator 307 from coupling into the camera 306 by way of the cover glass.

Glare, such as veiling glare, propagating in the cover glass from the illuminator 307 is depicted in FIGS. 3C and 3D by notional dashed line arrows. The optical barrier region 310B may substantially reduce veiling glare, substantially inhibiting any of the illuminator's diffuse stray light from reaching the image plane of the camera 306. Accordingly, the optically barrier region 310B is shown in FIGS. 3C and 3D as blocking the notional dashed line arrows, so as to depict such substantial reduction in veiling glare from the illuminator 307.

As shown in lateral cross section in FIG. 3C, the optical barrier region 310B may corresponding to ion exchange extending entirely or substantially through thickness of the cover glass (highlighted by cross hatching extending through the thickness of the cover glass) similar to the optical barrier region 310A in FIG. 3A. In another embodiment, which is shown in lateral cross sectional view in FIG. 3D, photolithographically patterned masking may selectively inhibit and allow ion exchange in the cover glass, as highlighted by alternating cross hatching. Such adjacent changes from increased index of refraction to lower index of refraction and/or changes from lower index of refraction to increased index of refraction may provide the refractive index barrier in the optical barrier region 310B of the cover glass, which is similar to the optical barrier region 312A in FIG. 3B.

For the sake of simplicity In FIG. 3D, only a modest number or index changes are shown for the optical barrier region 310B. However, a very large number of index changes may be employed. Further, for the sake of simplicity, patterning is coarsely shown in FIG. 3D. However the patterning may be finely spaced and/or may be varied, so as to provide an optical grating at various light wavelengths.

Figure 4:
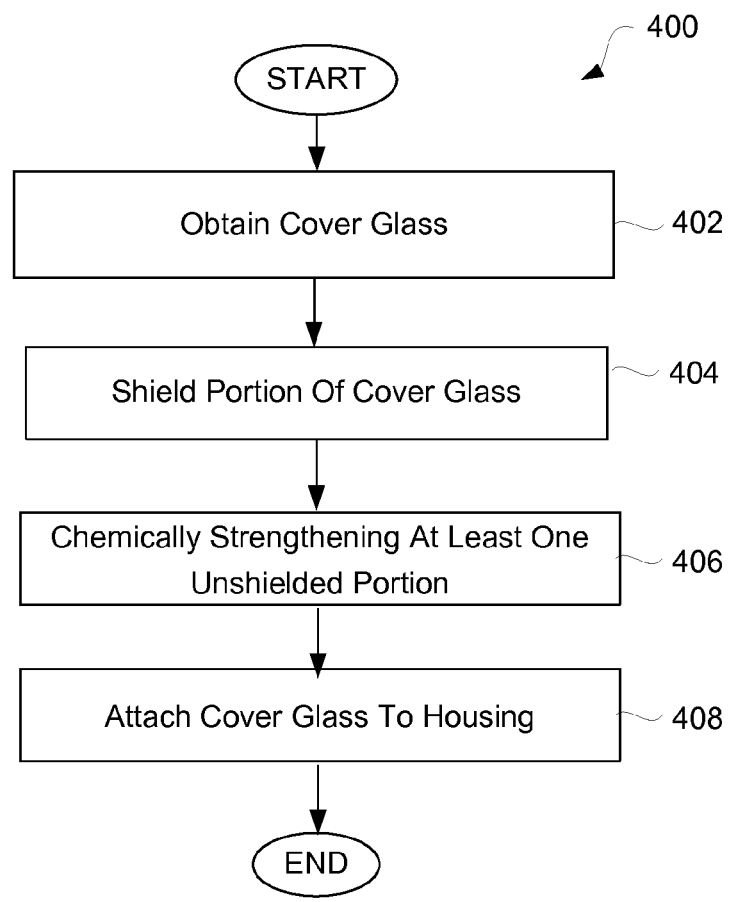
FIG. 4 is a flow diagram showing one embodiment of an assembly processes.

FIG. 4 is a flow diagram illustrating an assembly process 400 of one embodiment. The assembly process 400 may begin with obtaining 402 a cover glass. The assembly process 400 may continue with shielding 404 a portion of the cover glass. The shielding may provide the cover glass with at least one shielded portion and at least one unshielded portion. In one embodiment, such shielding 404 may involve patterning (or, more particularly, photolithographic patterning) on the cover glass.

The assembly process 400 may continue with chemically strengthening 406 the at least one unshielded portion of the cover glass. The at least one unshielded portion of the cover glass may be exposed to ion exchange. The assembly process 400 may continue with subsequently attaching 408 the cover glass to the housing. Once the cover glass has been attached to the housing, the assembly process 400 can end.

Figure 5:
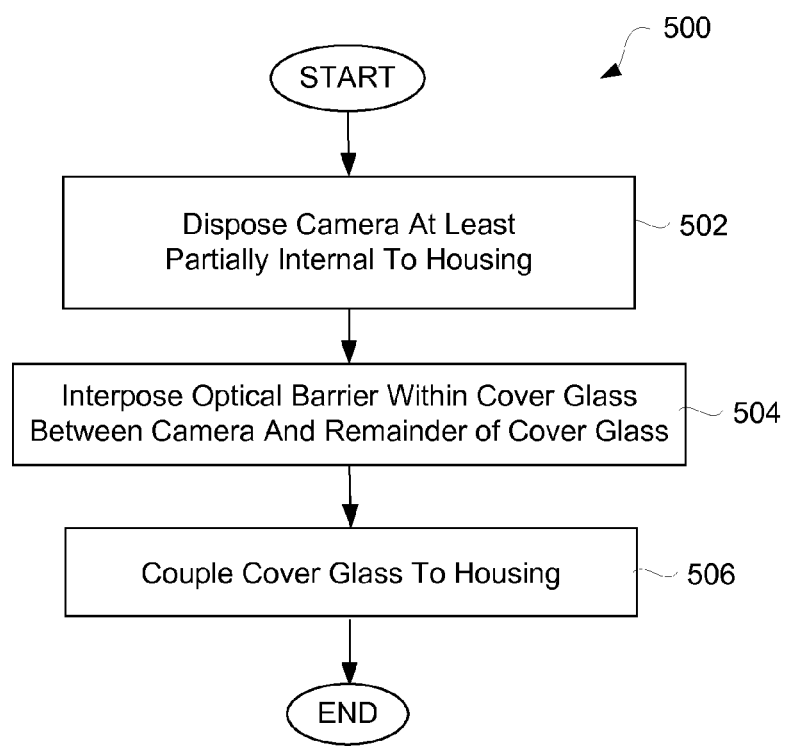
FIG. 5 is a flow diagram showing another embodiment of an assembly process.

FIG. 5 is a flow diagram illustrating an assembly process 500 of another embodiment. The assembly process 500 may begin with disposing 502 electrical components comprising a camera at least partially internal to a housing. The assembly process 500 may continue with interposing 504 an optical barrier region within the cover glass between the camera and a remainder of the cover glass. The cover glass may be disposed adjacently to the camera, and may be substantially transparent to the camera. The optical barrier may serve to reduce veiling glare.

The assembly process 500 may continue with coupling 506 the cover glass to the housing. Once the cover glass has been coupled to the housing, the assembly process 500 can end.

The advantages of the invention are numerous. Different aspects, embodiments or implementations may yield one or more of the following advantages. One advantage is that cover glass can be process to provide translucent optical barriers. Another advantage is that a camera can be integrated into an electronic device behind a cover glass. Another advantage is improved image or video quality may result from substantially reduced veiling glare.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A consumer electronic product, comprising:
   a housing;
   electrical components disposed at least partially internal to said housing; and
   a cover glass coupled with the housing, wherein the cover glass comprises an optical barrier interposed within the cover glass between at least one of the electrical components and a remainder of the cover glass, the optical barrier being formed through chemically strengthening of a portion of the cover glass.

2. The consumer electronic product as recited in claim 1 wherein the cover glass further comprises optical features disposed in the cover glass.

3. The consumer electronic product as recited in claim 1 wherein the cover glass further comprises a plurality of optical barriers disposed in the cover glass.

4. The consumer electronic product as recited in claim 1 wherein the optical barrier comprises at least one refractive index barrier disposed in the cover glass.

5. The consumer electronic product as recited in claim 1 wherein the optical barrier comprises a substantial change in refractive index disposed in the cover glass.

6. The consumer electronic product as recited in claim 1 wherein the optical barrier interposed within the cover glass is patterned.

7. The consumer electronic product as recited in claim 1 wherein the optical barrier interposed within the cover glass is formed with a photolithographic pattern provided on the cover glass.

8. The consumer electronic product as recited in claim 1 wherein the electrical components comprise a camera.

9. A consumer electronic product, comprising:
   a housing;
   electrical components disposed at least partially internal to the housing, said electrical components including at least a camera; and
   a cover glass coupled to the housing, the cover glass being substantially transparent to the camera, the cover glass including at least one optical barrier formed through chemically strengthening a portion of the cover glass, and the at least one optical barrier being interposed within the cover glass between the camera and a remainder of the cover glass for reducing glare at the camera via the cover glass.

10. The consumer electronic product as in claim 9 wherein the glare is veiling glare.

11. The consumer electronic product as in claim 9 wherein the at least one optical barrier is formed by selectively chemically strengthening the cover glass.

12. The consumer electronic product as in claim 9 wherein the remainder of the cover glass comprises a majority region of the cover glass, and wherein a minority region of cover glass is adjacent to the camera.

13. The consumer electronic product as in claim 9 wherein the optical barrier comprises a refractive index barrier.

14. The consumer electronic product as recited in claim 9 wherein the optical barrier presents a substantial change in refractive index disposed in the cover glass.

15. The consumer electronic product as recited in claim 9 wherein a peripheral region of cover glass is adjacent to the camera.

16. The consumer electronic product as recited in claim 9 wherein the cover glass substantially overlaps the camera.

17. The consumer electronic product as recited in claim 9 wherein the electrical components further comprise a display, and wherein the cover glass is substantially transparent to the display and arranged so that the display is viewable through the cover glass.

18. The consumer electronic product as recited in claim 9 wherein the electrical components further comprise an illuminator; and wherein the cover glass is substantially transparent to the illuminator and arranged so that illumination projects outwardly from the cover glass.

19. A consumer electronic product, comprising:
    a housing;
    electrical components disposed at least partially internal to said housing, said electrical components comprising at least a camera and an illuminator; and
    a cover glass substantially transparent to the camera and the illuminator, the cover glass including at least an optical barrier region being disposed within the cover glass between the camera and the illuminator, the optical barrier region being formed through chemically strengthening of a portion of the cover glass.

20. The consumer electronic product as recited in claim 19 wherein the optical barrier region serves to substantially reduce light from the illuminator from coupling into the camera by way of the cover glass.

21. The consumer electronic product as recited in claim 19 wherein the light from the illuminator being reduced from coupling into the camera is glare.

22. The consumer electronic product as recited in claim 21 wherein the glare is a veiling glare.

23. A method for assembling an electronic product comprising:
    obtaining cover glass;
    shielding a surface portion of the cover glass, the shielding providing the cover glass with at least one shielded surface portion and at least one unshielded surface portion;
    chemically strengthening the at least one unshielded surface portion of the cover glass;
    disposing the cover glass adjacent to a camera, the cover glass including at least an optical barrier interposed within the cover glass between the camera and a remainder of the cover glass, the optical barrier being formed through chemically strengthening of a region of the cover glass; and
    subsequently attaching the cover glass to a housing for the electronic product.

24. The method as recited in claim 23 wherein the chemical strengthening comprises patterning the at least one shielded surface portion of the cover glass.

25. The method as recited in claim 23 wherein the chemical strengthening comprises photolithographically patterning the at least one shielded surface portion of the cover glass.

26. A method for assembling an electronic product comprising:
    disposing electrical components comprising a camera at least partially internal to a housing; and
    coupling the cover glass to the housing,
    wherein the cover glass is adjacently disposed to the camera, wherein the cover glass is substantially transparent to the camera, and wherein the cover glass includes at least an optical barrier interposed within the cover glass between the camera and a remainder of the cover glass, the optical barrier being formed through chemically strengthening of a portion of the cover glass.

27. The method as recited in claim 26 wherein the optical barrier serves to reduce veiling glare.

28. The method as recited in claim 26 wherein the cover glass comprises optical features disposed in the cover glass.

29. The method as recited in claim 26 wherein the cover glass comprises at least one refractive index barrier disposed in the cover glass.

30. The method as recited in claim 26 wherein the cover glass comprises a substantial change in refractive index disposed in the cover glass.

31. The method as recited in claim 26 wherein the optical barrier is patterned.

32. The method as recited in claim 26 wherein the optical barrier is formed with a photolithographic pattern provided on the cover glass.

* * * * *